May 4, 1926.

J. P. CLARKE

SPARE TIRE SAFETY GUARD

Filed June 17, 1925

1,583,659

WITNESSES

INVENTOR
James P. Clarke,
BY
ATTORNEYS

Patented May 4, 1926.

1,583,659

UNITED STATES PATENT OFFICE.

JAMES P. CLARKE, OF NEW YORK, N. Y.

SPARE-TIRE SAFETY GUARD.

Application filed June 17, 1925. Serial No. 37,757.

*To all whom it may concern:*

Be it known that I, JAMES P. CLARKE, a citizen of the United States, and a resident of the city of New York, borough of the Bronx, in the county of Bronx and State of New York, have invented a new and Improved Spare-Tire Safety Guard, of which the following is a full, clear, and exact description.

This invention relates to spare tire safety guards, an object of the invention being to provide a guard which is secured over a spare tire and which prevents children from stealing a ride by sitting or crouching within the spare tire or tires at the rear of cars.

A further object is to provide a device of this character which functions as an enclosure and permits the carrying of articles within the spare tire.

A further object is to provide a device of this character which in connection with a chain functions to lock the spare tire and prevent theft thereof.

With these and other objects in view, the invention consists in certain novel features of construction and combinations and arrangements of parts, which will be more fully described hereinafter and pointed out in the claim.

In the accompanying drawings—

Figure 1:
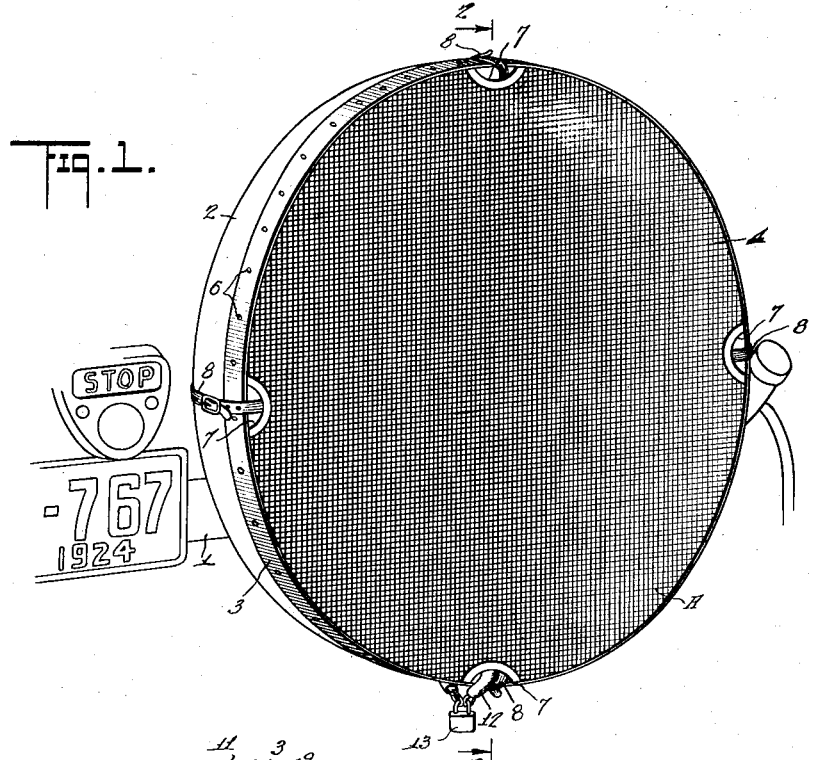
Figure 1 is a perspective view illustrating my improved device in operative position.

1 represents an automobile and 2 a spare tire which is supported at the rear thereof. On this spare tire my improved guard A is mounted. The guard A comprises an outer ring 3, preferably of metal. An outer covering 4, preferably of wire mesh, is fixed to the ring 3, a preferable arrangement being to secure the edge of the wire mesh to the ring by providing a clamping band 5 between which and the ring 3 the wire mesh is located, and rivets 6 are projected through the band, netting and ring, although of course I do not limit myself to the particular manner of securing the parts together.

The wire mesh 4 is provided at suitable intervals with openings 7, and straps 8 are secured to the band 5, preferably by rivets 9, and are adapted to be passed around the spare tire 2 and the rim holder 10 and secured at their free ends to buckles 11 carried by the straps 8.

In addition to one of these straps I may provide an ordinary tire securing chain 12 with its padlock 13, so that the chain will function to hold the guard in place and also to lock the spare tires on their holders.

Figure 2:
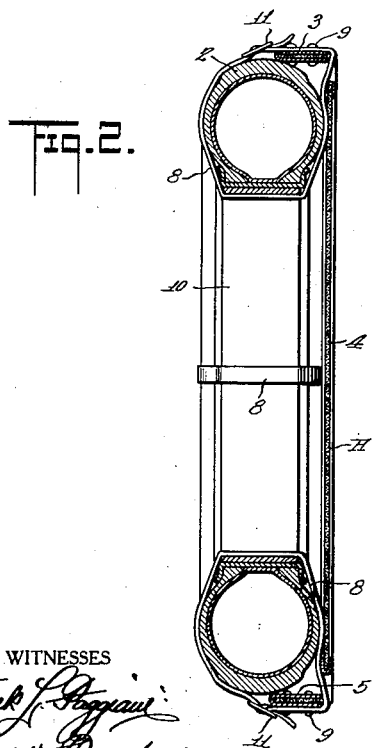
Figure 2 is a view in section on the line 2—2 of Figure 1.
Figure 3:
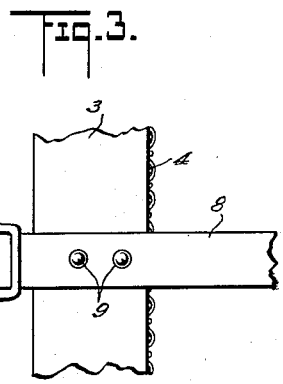
Figure 3 is a fragmentary detail view showing the manner of securing one of the straps to the guard.

It is to be noted that the ring 3 is of a proper diameter to fit over the spare tire, as clearly shown in Figure 2, and that the device constitutes a closure or end closure so as to prevent a person from sitting within the spare tire, and in addition provides a compartment for the storage of articles as is apparent.

Various slight changes and alterations might be made in the general form of the parts described without departing from my invention, and hence I do not limit myself to the precise details set forth but consider myself at liberty to make such slight changes and alterations as fairly fall within the spirit and scope of the appended claim.

I claim:

A spare tire safety guard, comprising a metal ring of a diameter to fit over a spare tire, a wire netting secured throughout its entire edge to the metal ring and having openings therein adapted to receive securing means therethrough when said securing means are positioned around the tire.

JAMES P. CLARKE.